United States Patent [19]

Schweri

[11] Patent Number: 5,197,935
[45] Date of Patent: Mar. 30, 1993

[54] PACKAGE FOR FLOWABLE CONTENTS WITH AN EXTERNALLY SMOOTHLY CONSTRUCTED SEALING SEAM, A METHOD OF PRODUCING SUCH A PACKAGE AND AN APPARATUS FOR CARRYING OUT THE METHOD

[75] Inventor: Benedikt Schweri, Romont, Switzerland

[73] Assignee: Tetra Alpha Holdings S.A., Pully, Switzerland

[21] Appl. No.: 838,485

[22] Filed: Feb. 19, 1992

Related U.S. Application Data

[62] Division of Ser. No. 612,078, Nov. 9, 1990, abandoned.

[51] Int. Cl.⁵ .............................................. B31B 1/74
[52] U.S. Cl. ..................................... 493/85; 493/121; 264/263; 264/267
[58] Field of Search ................. 493/85, 110, 114, 121, 493/128, 129; 264/263, 267; 413/72, 74, 77

[56] References Cited

U.S. PATENT DOCUMENTS

| | | | |
|---|---|---|---|
| 2,201,416 | 5/1940 | Wagner | 493/110 |
| 2,261,416 | 11/1941 | Schrier | 264/267 |
| 2,581,751 | 1/1952 | Chase, Jr. | 413/77 |
| 3,920,787 | 11/1975 | McDowell | 264/263 |
| 4,626,391 | 12/1986 | Taylor | 264/263 |
| 4,628,850 | 12/1986 | Day | 264/263 |

Primary Examiner—Bruce M. Kisliuk
Assistant Examiner—Jack Lavinder
Attorney, Agent, or Firm—Joseph G. Nauman

[57] ABSTRACT

The invention describes a liquids package having side walls as well as upper and lower walls serving as top and bottom respectively, a side wall and the top having a sealing seam (6) extending along edges (14', 16') of adjacent wall panels (14). So that the package may have a smooth outer surface in the region of sealing seams, without the formation of synthetic plastics beads or the like, it is according to the invention envisaged that the outer surface (22, 23) of the two wall panels which are connected to each other by the sealing seam (6) are disposed to merge steadily into each other via the gap (24) along at least one end face of an edge (14') which belongs to the relevant wall panel (14) so that the other surfaces are flush in cross-section, and in that the sealing seam (6) is masked on the inside of the package by a synthetic plastics bead (21).

2 Claims, 6 Drawing Sheets

PACKAGE FOR FLOWABLE CONTENTS WITH AN EXTERNALLY SMOOTHLY CONSTRUCTED SEALING SEAM, A METHOD OF PRODUCING SUCH A PACKAGE AND AN APPARATUS FOR CARRYING OUT THE METHOD

RELATED APPLICATION

This application is a division of parent application Ser. No. 07/612,078 filed Nov. 9, 1990 now abandoned.

The invention relates to a package for flowable contents, particularly milk, juices or the like, consisting of side walls and also an upper wall and a lower wall serving as top and bottom respectively, at least one side wall and/or top and/or bottom having a sealing seam extending along edges of adjacent wall panels. Furthermore, the invention relates to a method of producing such a package and also to an apparatus which permits the manufacture of such a package and at least partially applying the method, the apparatus having two injection moulding dies adapted for movement relatively to each other.

For the packaging of liquids, various types of package are known and substantially all comprise side walls, top and bottom and some of them have a sealing seam which is provided to extend along edges of adjacent wall panels. The general problem of package manufacturers where wall panels are provided which have a sealing seam consisting of synthetic plastics coated paper, resides in the sealing-tightness of the seam which must naturally be fluid-tight in the case of packages which are used for fluids.

Further demands which are imposed on liquids packages are ready facility for distribution, stackability for repackaging being especially desirable, and also good appearance. Many types of liquids packages which consist of paper cannot be produced without sealing seams and for ready stacking above and/or alongside one another, all manner of sealing seam techniques have been applied, whereupon the seams have been reversed and laid flat on the surface. From the aesthetic standpoint of good appearance on the one hand and in consideration of the space required, on the other, it is desirable to have packages which have smooth or flat exterior walls.

It is a drawback that prior art packages have in the region of a sealing seam a bead which not only makes for an unfavourable appearance for the observer but also impedes handling or the mechanical processing of the completed packages.

Since it is important, particularly in the case of liquids, for connecting seams to be fluid-tight and mechanically secure, sealing seams have been created in which the edges of adjacent wall panels overlap for a certain part of their width and are welded together; alternatively, butt-welded edges are provided when the end faces of adjacent edges abut one another and are sealed to one another with a synthetic plastics bead. It is evident that in both cases, in the region of the sealing seam, it is apparently unavoidable to have on the surface of the package a bead, generally an injection moulded bead of synthetic plastics material, and in the case of edges which overlap they are additionally thickened by an edge. Not solely for reasons of a good outward appearance of such a fluids package but also for better handling, so that machine parts do not foul the beads and so that the package is not damaged by its own sealing seams, it would be desirable to have smooth surfaces in the region of any sealing seams which are provided.

The object of the present invention therefore is to provide a manufacturing process and an apparatus for producing such a package which provides in the region of sealing seams a smooth outer surface without any synthetic plastics or paper beads projecting.

With regard to the package itself, this problem is according to the invention resolved in that the outer surface of the wall with the sealing seam is of smooth construction so that the surfaces of the two wall panels which are connected to each other by the sealing seam are disposed so that, in cross-section, they are flush and merge steadily into each other via the gap alongside at least one end face of an edge which is part of the relevant wall panel, and in that on the inside of the package the sealing seam is masked by a synthetic plastics bead. The outcome of the above-mentioned measures is that the outer surface of the wall of the package which has the sealing seam is smooth. A sealing seam is intended tightly to connect to each other two edges of two adjacent wall panels, and therefore even with an externally smoothly constructed wall surface of the package, a gap is unavoidable but it is not by any means a problem if the surfaces of the two walls alongside the gap are flush with each other and if the surfaces steadily merge into each other in cross-section. It is possible in fact to envisage curved or flat surfaces in which the described sealing seams are disposed. In the case of a parallelepiped milk package having flat walls, the measure according to the invention would mean that the surface would extend plane, smooth and steplessly over the gap. In the case of curved surfaces which overrun the sealing seam, this also means that there is no step in the region of the sealing seam while the surface does however remain steadily curved or the curvature varies steadily. In any case, an advantage of the invention is that a step-like jump at the sealing seam exterior is avoided.

It is true that attempts have been made already, with overlapping edges, to provide a step-free transition and thus a smooth surface, but in the case of prior art packages this has been possible only by partially milling off the package material along the edge. This marginal milling process, also referred to as "skiving", is however complicated and expensive. With the measures according to the invention, on the other hand, similar results, and on the outer surface even identical results, can be achieved with quite simple means, as will be described hereinafter in connection with the process.

If, according to a further development of the invention, the sealing seam is disposed in the region of separation between a wall insert and a side wall and/or the top and/or the bottom, then a man skilled in the art will readily understand that even in the case of fairly complex designs of package, in the walls of which in practice inserts of different configuration can be disposed, the connecting seams between the inserts and the package wall can enjoy the same advantages. In other words, also the sealing seam between a wall insert of any desired configuration and the relevant package wall may be constructed to be externally smooth and without any steps. The aforementioned measures can therefore be advantageously applied in the case of so-called butt-welded sealing seams or also in the case of sealing seams which have overlapping edges.

If in the case of another advantageous development of the invention the sealing seam is formed by overlapping disposed edges, and if the outer surface of the wall with the sealing seam is of smooth construction so that alongside the end face of the first outer overlapping edge of the sealing seam the wall alongside the other second inner edge of the sealing seam is disposed flush with and at the same height as the first outer edge, then the construction will be quite clearly understood in the case of overlapping paper panels. In other words, one may imagine two paper walls which are coated on both surfaces with synthetic plastics material) and which are intended to be connected to each other by overlapping along a straight (or even regularly curved) line so that the observer only sees a perfectly smooth surface and does not recognize the overlap from outside, although the above-described gap is still visible. This gap is, in fact, formed by the end face of the first outer overlapping edge. The wall belonging to this first edge therefore has its middle portion extending over the edge quite evenly and smoothly as far as the end face. To the viewer, this is followed by the scarcely visible gap which extends along the line in question or parallel with the sealing seam and where the other wall is concerned, then, this is flush with and at the same height as the second paper wall which has to be connected to the first. The connection is made via the said second inner edge which is quite invisible to anyone looking at the outside of the package.

As a result of the aforementioned measures, therefore, the desired purpose, which is to provide a package which has externally smooth surfaces while being at the same time fluid-tight, is indeed achieved while the measures according to the invention mean that it is readily stackable, easily transported and is not easily damaged by any handling activity, because encroaching fingers or the like can in any case not foul any projecting beads.

According to the invention, it is furthermore advantageous if the outer surface of the outer overlapping edge of the sealing seam merges steadily into the outer surface of the wall panel which belongs to this edge, and if the inner edge which belongs to the other wall panel encircles the end face of the outer edge in a steplessly curved fashion. It has been pointed out earlier that this new type of sealing seam can extend both in curved as well as on plane surfaces. If the outer surface of one wall merges steadily into the outer surface of the other wall, then according to the invention a sealing seam can extend underneath it and join two adjacent walls, whether it extends in one or more planes or in curved surfaces. Particularly in the case of overlapping edges, a man skilled in the art knows that the overlap forms a step which despite high pressures cannot be entirely eliminated when a sealing seam is produced. Nevertheless, if a man skilled in the art does not see any step of any kind from outside, he can, by observing this last-mentioned further development of the invention, see that there is indeed a step but that it is (in the region of the sealing seam) on the inside of the package so that the onlooker will not notice this from the outside.

In the case of sealing seams which have overlapping edges, a man skilled in the art has often in the past had difficulty observing tolerances, particularly the width of the overlapping zone which ought not to exceed predetermined tolerances. Even in the case of butt-welded beads along the edges of adjacent walls, where the sealing seam was made by, for instance, injecting synthetic plastics bridges into the gaps between adjacent wall panels, exact tolerances had to be observed. Thus, the tools have frequently been complicated, especially in the case of injection moulding and at the high pressures which occur in the process, and where there was in addition movement in the halves of the mould. At the same time, the tolerances had to be observed in order for the injected seam to be really fluid-tight.

A particular advantage of this invention resides in the fact that if the measures according to the invention are observed, these tolerances no longer have to be respected. Someone looking at a package cannot from the outside establish the width of an overlap zone. Even the slightly varying width of the gap between two wall edges, which are placed against each other face to face, is of hardly any importance to the appearance, because the width is almost undetectable and there is provision for sealing-tightness because according to the invention a step or an injected bead can be left on the side of the sealing seam which is towards the interior of the package.

With regard to the method of producing the package mentioned at the outset, these advantages are achieved in that synthetic plastics material is injected at high pressure onto the sealing seam from the inside surface of the package, a bead of synthetic plastics material being left along the sealing seam. It is actually this synthetic plastics bead which ensures not only sealing-tightness but also the mechanical strength of the seam and at the same time the bead is not visible from outside. Instead, to an onlooker the surface appears to be smooth and regular. On paper which is coated with synthetic plastics material on at least one surface, it is known to inject synthetic plastics shapes, whether they represent a complete top, a bottom, both or whether all that is involved is a butt-welded seam or the like. According to the invention, the synthetic plastics bead, so to speak as the main part of the sealing seam, is injected from the inside onto the marginal zone to form and support the sealing seam. Actually due to the high pressure, e.g. a clamping force of about six tons between the individual mould parts, the cross-sectional profile of the sealing seam is so altered that even in the case of overlapping edges the step is shifted towards the inner surface so that the outer surface remains smooth, as is required.

Actually in order to influence the desired cross-sectional profile, the apparatus for producing a package similar to the above-described type having two injection moulding dies adapted for movement relatively to each other, is characterised in that the first outer injection moulding die which is disposed on the outer surface of the package has a smooth surface in the region of the sealing seam, and the second inner injection moulding die which can be applied to the inside of the package wall has a groove connected to an injection moulding aperture and extending along the sealing seam of the package wall. Due to this configuration of the tool, the user thereof imposes on the package walls on the one hand, and on the synthetic plastics material which is injected at high pressure on the other hand an externally smooth surface in the region of the connecting seam while the groove on the inside of the desired synthetic plastics bead is formed along the sealing seam and on the inside of the package.

Further advantages, features and possible applications of the present invention will emerge from the ensuing description of preferred examples of embodiment in conjunction with the appended drawings, in which.

Figure 1:
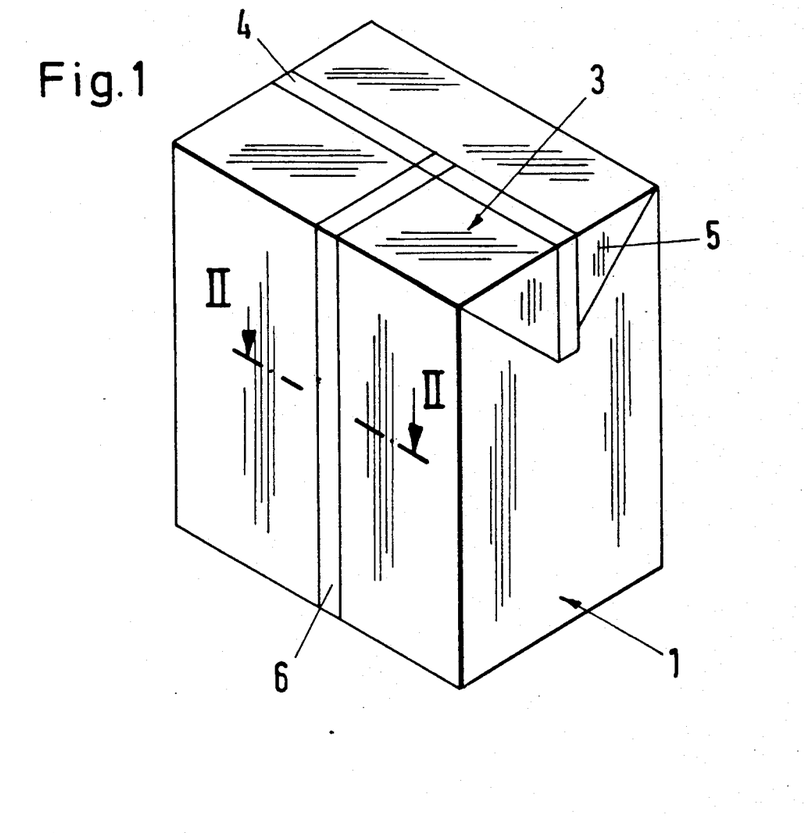
FIG. 1 is a perspective view of a typical parallelepiped package with a transverse and longitudinal sealing seam to which the present invention is applicable.
Figure 3:
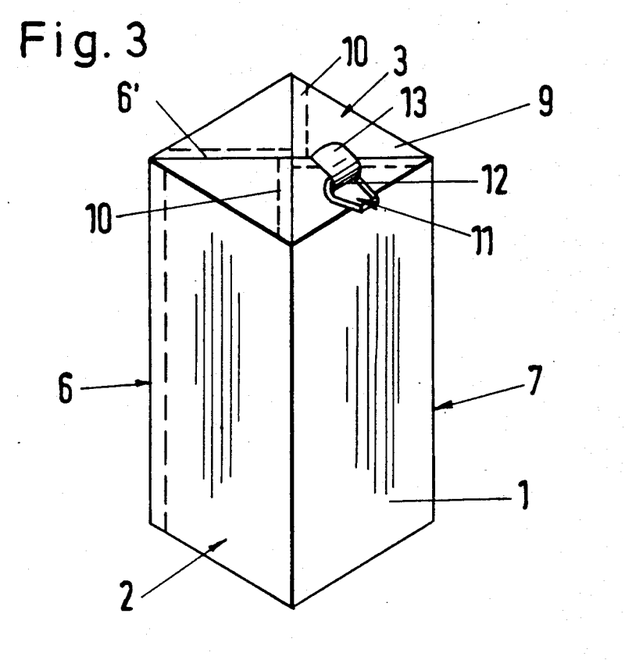
FIG. 3 shows a differently formed liquids package with tubularly formed side walls, the top being formed from four folded-in wall panel parts which are connected to one another by injected bridges of synthetic plastics material.
Figure 4:
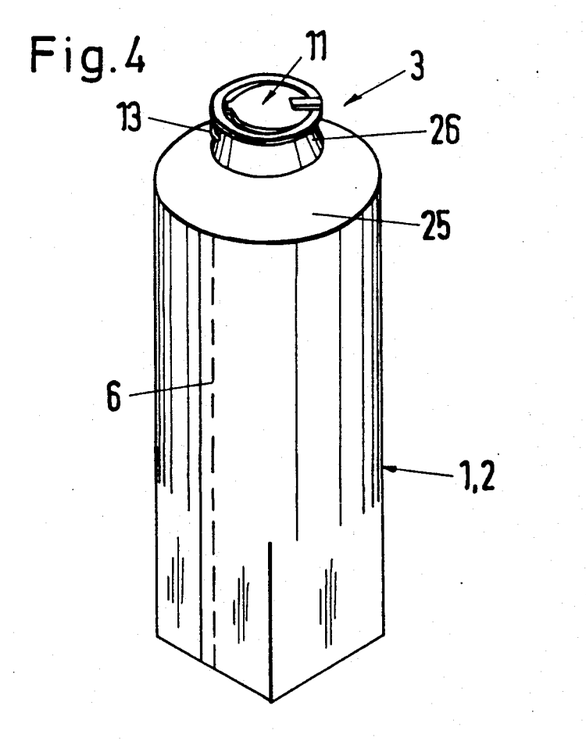
FIG. 4 shows a third and different embodiment of a package with tube-shaped side walls, the cross-section of the tube being tetragonal in the region of the bottom and round in the region of the top.

FIGS. 1, 3, and 4 show three different embodiments of package for milk, each having side walls 1, 2, a top 3 and a bottom which is not described in greater detail.

In the case of the embodiment shown in FIG. 1, this is a parallelepiped package in which the top is formed by sealing along a transverse sealing seam 4 and folding down triangular end flaps 5. The sealing seam which is of interest in this embodiment is designated 6 and is the so-called longitudinal sealing seam, of which the cross-sectional profile taken on the line II—II in FIG. 1 is shown in a broken-away view in FIG. 2. and which improved according to the invention. This improved sealing seam generally designated 6 is shown in several other embodiments, particularly in FIGS. 11 to 14 and 16.

Where the embodiment according to FIG. 3 is concerned, the sealing seam lies along the tube generally designated 7 in one of its four edges, whereas in the embodiment shown in FIG. 4 the longitudinal sealing seam extends from the rectangular bottom to the circular top.

The top 3 in the embodiment shown in FIG. 3 consists of four triangular wall panels of which only the panels 8 and 9 are shown in particular. They are connected either by a type of butt-welded seam or by an overlapping edge 10 along cruciformly extending sealing seams 6'. One triangular wall panel 8 has the opening device generally designated 11 and which comprises a pourer spout 12 and in the case of this particular embodiment an articulating hinge 13.

Figure 5:
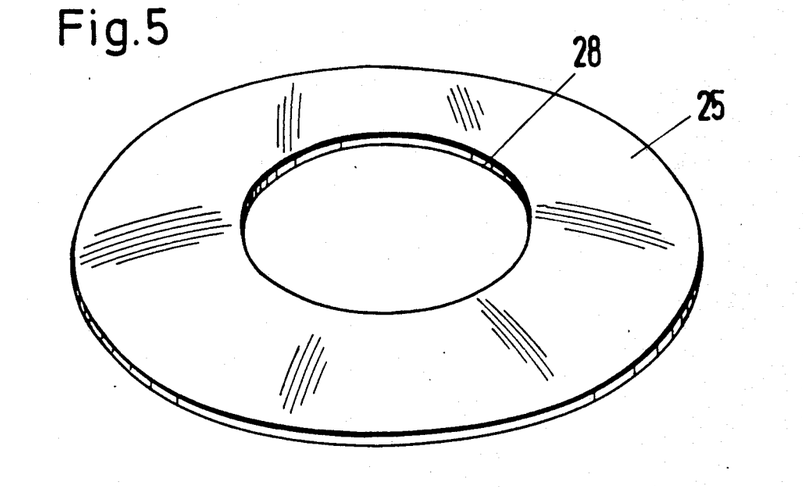
FIG. 5 shows an annular paper wall with a central hole as far the top of the package shown in FIG. 4.
Figure 6:
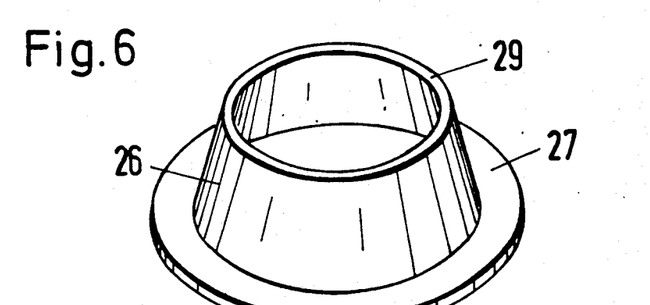
FIG. 6 shows a frustoconical paper body with, applied to the bottom, an overlapping edge for insertion into the hole in the annular surface of the wall shown in FIG. 5.
Figure 7:
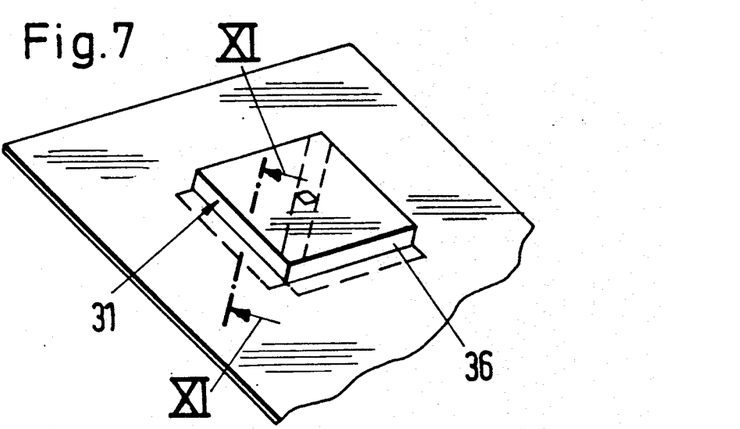
FIG. 7 shows a wall of a package with an integrally welded wall insert.
Figure 8:
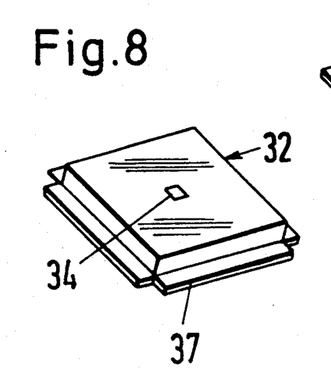
FIG. 8 is a perspective view of the wall insert prior to insertion and connection with the package wall.

Neither the opening device 11 according to FIG. 3 nor that according to FIGS. 4–6, is the object of the ensuing description. It is only intended to mention here that both opening devices 11 are injection moulded completely from synthetic plastics material.

Figure 11:
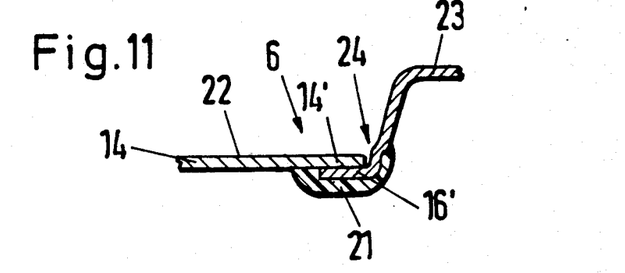
FIG. 11 is a broken-away diagrammatic cross-sectional view taken on the line XI—XI in FIG. 7.
Figure 12:
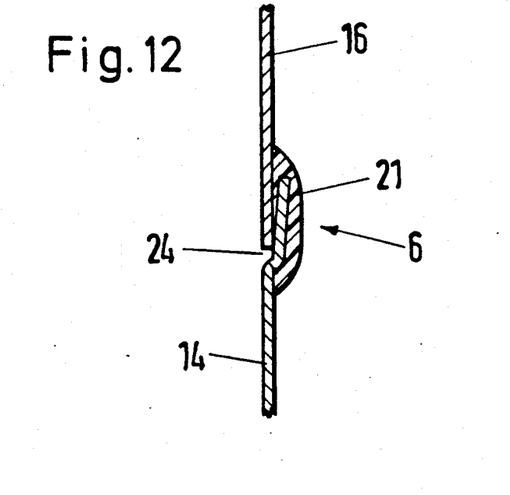
FIG. 12 is a broken-away cross-sectional view similar to that in FIG. 2, in which the sealing seam is constructed according to the invention.
Figure 13:
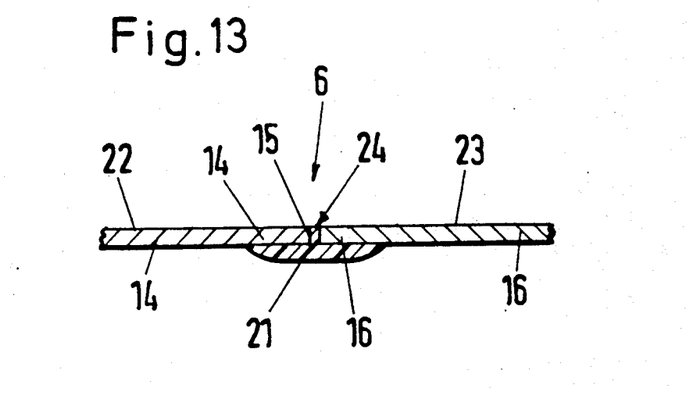
FIG. 13 shows a different type of sealing seam according to the invention in which the end faces of adjacent edges of wall panels which are to be connected are connected to each other along their end faces (butt-welding seam)
Figure 14:
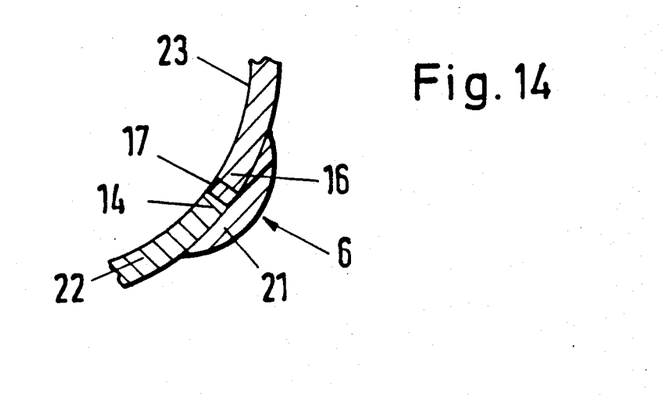
FIG. 14 shows a sealing seam of the type shown in FIG. 13 but in which the two wall panels which are to be joined are curved, their outer (convex) surfaces merging steadily into one another.
Figure 16:
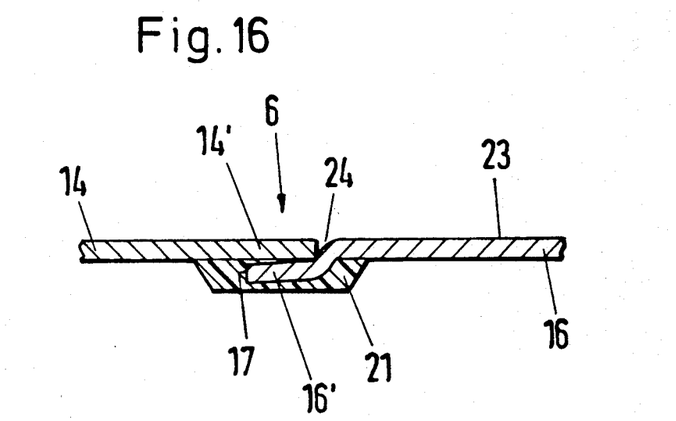
FIG. 16 shows the sealing seam with overlapping edges after the injection moulding process in the form according to the invention, providing an externally plane surface.

For understanding of the invention, and on a basis of the cross-sectional views of the sealing seam, reference is made particularly to an embodiment according to FIGS. 11, 12 and 16 and to the other embodiment according to FIGS. 13 and 14. One wall panel 14 with its associated edge 14' is in the case of this sealing seam with overlapping edges the first wall with the first outer overlapping edge 14'. This edge 14' ends at the end face 15. The oppositely disposed second wall is 16 and comprises the second inner edge 16' which likewise has an end face 17.

Figure 15:
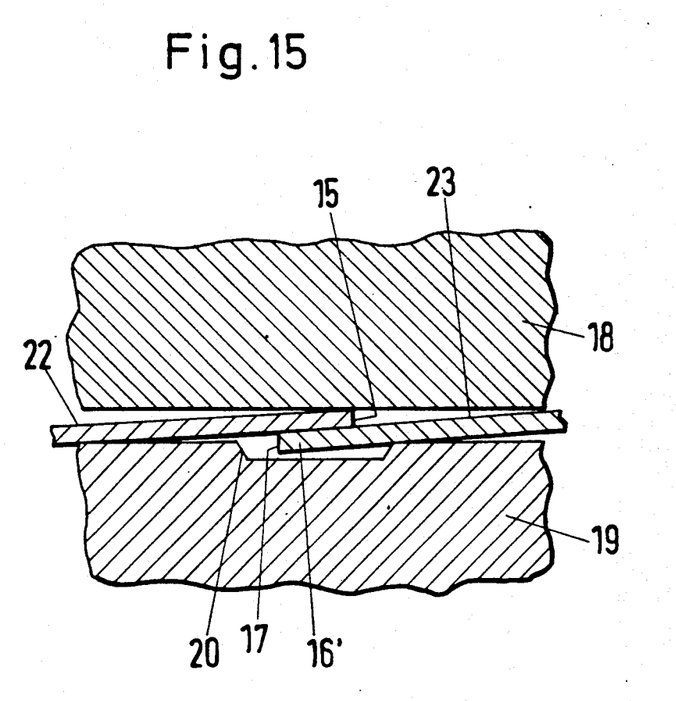
FIG. 15 shows the outer injection moulding die with a smooth surface, the sealing seam with overlapping edges being shown in between and the inner injection moulding die, all parts being broken away and shown diagrammatically in cross-section prior to the injection moulding process.

The situation prior to forming of the sealing seam 6 is shown in FIG. 15 where the two overlapping edges 14' and 16' are disposed between the upper outer injection moulding die 18 and the inner injection moulding die 19 which is disposed under the walls 14 and 16 and which comprises a groove 20 in the region of the sealing seam 6 which is to be formed. This is connected to an injection moulding orifice not shown here through which, during operation, the synthetic plastics material is so injected at high pressure that the edges 14' and 16' are indeed somewhat compressed but the not entirely avoidable step is accommodated by the groove 20 which becomes entirely filled with synthetic plastics material and so forms the synthetic plastics bead 21. Therefore, there is a raised strip projecting somewhat from the interior surface as a whole which is only on the side of the walls 14, 15 which faces the interior of the package, both the surface 22 of the one wall 14 and also the outer surface 23 of the other wall 16 merging steadily and flush into each other in cross-section. Only the scarcely visible gap 24 alongside the end face 15 of the edge 14' which belongs to the wall panel 14 remains visible.

In the case of the embodiment with the overlapping edges, according to the cross-sectional view in FIGS. 11, 15 and 16, the inner panel 16' which is part of the right-hand wall panel 16 is curved stepwise over the end face 15 of the outer edge 14'. The whole is enclosed by a synthetic plastics bead 21 which extends along the sealing seam 6, i.e. along the gap 24, along the end faces 15, 17 and along the edges 14', 16'.

Figure 2:
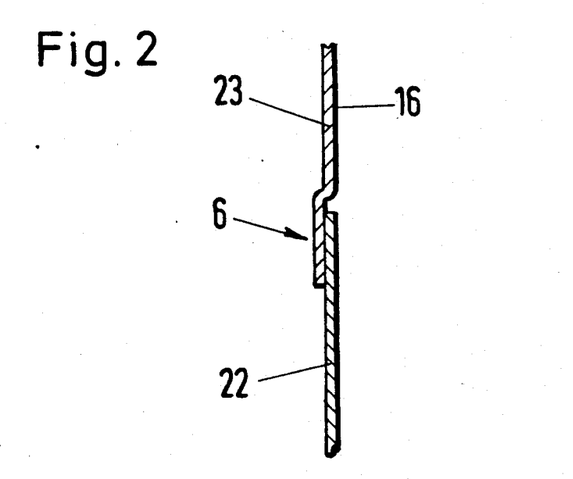
FIG. 2 is a cross-sectional view of the longitudinal sealing seam taken on the line II—II in FIG. 1.

FIG. 2 shows the cross-sectional form of an overlapping sealing seam 6 in the case of a conventional package according to FIG. 1 and it shows there the seam 6 which projects onto the first outer surface 22, 23. Directly alongside is the cross-sectional view in FIG. 12 because this is formed for the flat side face 2 of the package according to the invention. Shown in an enlarged form in FIG. 16 is the seam area which is described hereinabove. Accordingly, FIG. 12 also shows the synthetic plastics bead 21 on the right-hand side which will later constitute the surface of the walls 14 and 16 which face the interior of the package. Apart from the narrow gap 24, anyone looking at the package according to FIG. 1 can see nothing more of the sealing seam 6 if this is formed in accordance with the invention.

In the case of a tube 7 of the package according to the embodiment in FIG. 3, the overlapping sealing seam 6 lies in the edge of the cross-sectionally rectangular tube 4. Preferably, the described gap 24 is disposed directly alongside the longitudinal edge of the tube 7.

The sealing seam 6' shown in FIGS. 13 and 14 has in the end result properties similar to those of the other sealing seam 6, except that here the end faces of the edges abut instead of there being overlapped edges of the wall panels 14 and 16 which have to be joined. Using the same reference numerals, the viewer will again observe the edges 14' and 16' of the walls 14 and 16 which have to be joined and along the sealing seam 6' the end faces 15 and 17 are oppositely disposed and are connected by the synthetic plastics bead 21 itself. The difference between FIG. 13 and FIG. 14 lies only in the curvature of the surfaces 22 and 23 of the walls 14 and 16 which in the flat situation shown in FIG. 13 is zero, while in the curved situation in FIG. 14 it is not equal to zero but is regular so that in both embodiments the surfaces 22, 23 are disposed so that they merge steadily and cross-sectionally flush into each other across the gap 24.

Observing the package in FIG. 4, then the bottom part of the sealing seam 6 lies mainly in one plane, while the upper part is in the vicinity of the top 3 predominantly in a curved surface, the curvature being reversed in relation to the cross-sectional view in FIG. 14. Indeed, where the embodiment according to FIG. 14 is concerned, the sealing seam could be constructed like a butt-welded seam according to the embodiments in FIGS. 13 and 14 but preferably it is an overlapping seam according to FIGS. 11, 15 and 16.

Also in the case of the package according to FIG. 3, the cruciform sealing seam 6' in the top 3 may have a form similar to that of a butt-welded seam if one disregards the broken lines which, for another embodiment, indicate fixing tabs 10 so that the wall panels 8, 9 and the like may also be connected to one another by a sealing seam having overlapping edges 14', 16' according to the embodiment shown in FIG. 16.

The measures according to the invention which have been described thus far allow the formation of complex bodies such as, for example, the top of the package according to FIG. 4. In this case, the annular wall panel 25 according to FIG. 5 may represent the bottom part of the top 3 and the truncated cone 26 is likewise produced from synthetic plastics coated paper and is connected by the adhesive tab 27 in the hole 28 on the wall panel 25 via a sealing seam 6 which in cross-section looks like that shown in FIG. 11. Then, the synthetic plastics opening device 11 could be moulded into the upper edge 29. Of course, in practice, this construction is too complicated but it is chosen here to illustrate solutions according to the invention.

Another and final embodiment of the invention is shown in FIGS. 7 to 12.

Figure 9:
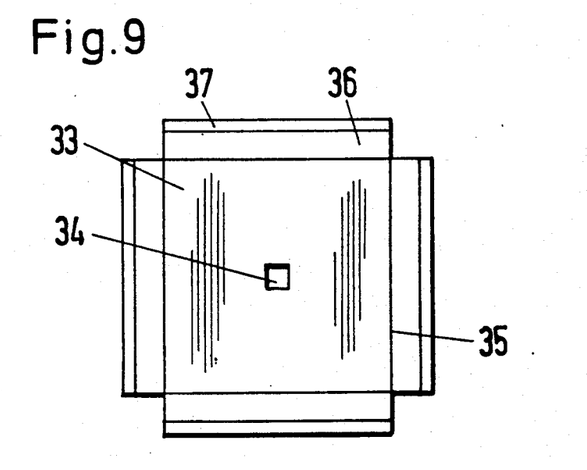
FIG. 9 shows the opened-up and unfolded blank of the wall insert in FIG. 8.

A flat wall 30 comprises a square hole 31 into which a wall insert 32 is inserted and connected b a sealing seam 6 such as is shown more or less in cross-section in FIG. 11. In the unfolded state, the wall insert 32 looks as it does in FIG. 9. A top wall panel 33 having a central aperture 34 is provided along its four straight edges 35 with narrow walls 36 each of which has on its outside a connecting tab 37. This corresponds substantially to the edge 16' in the view in FIG. 11. If this blank shown in FIG. 9 is folded into the spatial object shown in FIG. 8, then it is only necessary to push it upwards through the hole 31 under the wall panel 30 in FIG. 7 in order to obtain the arrangement shown in FIG. 7.

Figure 10:
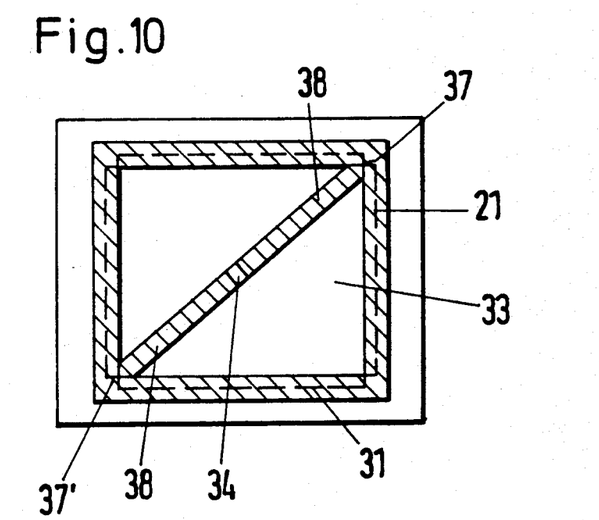
FIG. 10 is a view from below of the middle part of the area in FIG. 7 with an integrally moulded wall insert.

If the wall panel 30 is turned onto its head, then one sees the view in FIG. 10 with the outwardly somewhat smaller wall panel 30 and the hole 31 which is represented by the broken line. From the inside, the viewer is looking onto the rectangular bottom 33 of the wall insert 32 and onto the synthetic plastics bead 21 which represents the connecting seam which, lie a strip, extends around the bottom in a rectangular pattern. The synthetic plastics material required to form this synthetic plastics bead 21 flows centrally through the hole 34 and through connecting passages in the tool (grooves) not shown here into the corners 37, 37' so that the feed beads 38 which extend diagonally in between are formed. Functional only is the rectangularly extending frame-like synthetic plastics bead 21 shown in FIG. 10 and which in its cross-sectional view according to FIG. 11 engages over both the broken line 31 and also over the overlapping edge 37 corresponding to the edge 16' in FIG. 11.

I claim:

1. A method of producing a package for flowable contents, particularly contents such as milk, juices and the like, consisting of
   providing a carton blank having side walls (1, 2), an upper wall (3) providing a top, and a lower wall providing a bottom, at least one side wall (1 or 2) having edges of the blank adjoining to form a sealing seam (6, 6') extending along the edges of the side walls (14, 16);
   errecting the package from the blank, including overlapping such edges (14, 16) into juxtaposition, with the edge on the exterior of the package being flush with the adjoining side wall;
   then injection molding a synthetic plastics material onto the seam (6, 6') along the surface thereof which is on the inside of the package while backing the seam at the exterior of the package, thereby forming a bead (21) of the synthetic plastics material along the sealing seam (6, 6") at the interior of the package and leaving the seam flush with adjoining walls at the package exterior.

2. The method of claim 1, wherein the walls containing the seam include overlapping part (14', 16') whereby one wall part lies interior of the other wall part of the seam when the package is assembled, the injection molding of the synthetic plastic material being controlled to cover the interior overlapping wall part within the bead formed along the interior of the seam.

* * * * *